United States Patent
Fan et al.

(10) Patent No.: US 10,229,436 B1
(45) Date of Patent: *Mar. 12, 2019

(54) GENERATING CUSTOMIZED ADVERTISEMENTS WITH UNDISCLOSED ADVERTISER CONTENT

(71) Applicants: Peng Fan, Hayward, CA (US); Brian Rosenthal, Mountain View, CA (US); Himanshu Baweja, Menlo Park, CA (US)

(72) Inventors: Peng Fan, Hayward, CA (US); Brian Rosenthal, Mountain View, CA (US); Himanshu Baweja, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 1218 days.

This patent is subject to a terminal disclaimer.

(21) Appl. No.: 13/715,925

(22) Filed: Dec. 14, 2012

(51) Int. Cl.
*G06Q 30/00* (2012.01)
*G06Q 30/02* (2012.01)
*H04L 29/06* (2006.01)

(52) U.S. Cl.
CPC ..... *G06Q 30/0271* (2013.01); *G06Q 30/0224* (2013.01); *G06Q 30/0269* (2013.01); *H04L 63/0421* (2013.01)

(58) Field of Classification Search
CPC ........... G06Q 30/0271; G06Q 30/0224; G06Q 30/0269; H04L 63/0421
See application file for complete search history.

(56) References Cited

U.S. PATENT DOCUMENTS

| | | | | |
|---|---|---|---|---|
| 2003/0191689 A1* | 10/2003 | Bosarge | ................ | G06Q 30/02 705/14.35 |
| 2005/0222905 A1* | 10/2005 | Wills | ................... | G06Q 30/02 705/14.58 |
| 2011/0029362 A1* | 2/2011 | Roeding | ............... | G06Q 30/00 705/14.13 |
| 2011/0167003 A1* | 7/2011 | Nice et al. | ..................... | 705/50 |
| 2011/0313846 A1* | 12/2011 | Patwa et al. | .............. | 705/14.43 |

(Continued)

OTHER PUBLICATIONS

Wikipedia, "Attribute-value pair", Archived on Dec. 5, 2011, http://en.wikipedia.org/w/index.php?title=Attribute%E2%80%93value_pair&oldid=464222618.*

*Primary Examiner* — Michael Bekerman
*Assistant Examiner* — Scott Snider
(74) *Attorney, Agent, or Firm* — Fenwick & West LLP

(57) ABSTRACT

An entity such as a social networking system generates a dynamically customized user-specific advertisement using an advertisement template and user information from an advertiser. A request is received for an advertisement to display to a user, and the social networking system retrieves an advertisement template that includes one or more functions. The social networking system also retrieves user information to evaluate a value of a function contained in the advertisement. The advertiser can obscure the meaning of personal information from the social networking system, so that when the template and the value of each function are used to generate a dynamically customized user-specific advertisement for display to the user, the advertisement is obscured in some aspect from the social networking system. In this way, the advertiser may communicate with the user without disclosing all of the details of the communication to the social networking system that serves the advertisement.

26 Claims, 6 Drawing Sheets

(56) References Cited

U.S. PATENT DOCUMENTS

| | | | |
|---|---|---|---|
| 2012/0310747 A1* | 12/2012 | Calabria | G06Q 10/10 |
| | | | 705/14.67 |
| 2013/0246189 A1* | 9/2013 | Patel | G06Q 20/108 |
| | | | 705/14.67 |
| 2013/0304586 A1* | 11/2013 | Angles | G06Q 30/02 |
| | | | 705/14.66 |
| 2014/0052539 A1* | 2/2014 | Lauback | G06Q 30/0255 |
| | | | 705/14.66 |
| 2014/0101129 A1* | 4/2014 | Branish, II | G06F 17/30893 |
| | | | 707/714 |

\* cited by examiner

GENERATING CUSTOMIZED ADVERTISEMENTS WITH UNDISCLOSED ADVERTISER CONTENT

BACKGROUND

This invention relates to the creation of dynamically customized user-specific advertisements for users, such as users of a social networking system.

In a traditional advertising model, advertising companies that advertise to consumers maintain a large inventory of fixed advertisements intended for a variety of demographics. For this reason, advertising companies have attempted to streamline and modernize the process of creating advertisements so that, ultimately, more advertising can be sold. With the advent of online advertising, advertisers have gained more information about the users to whom they are advertising, such as by having the ability to track a computer user's online activities using cookies. This can allow advertisers to display advertisements to specific users or groups of users tailored to the users' online habits, such as by populating specific fields in an online advertisement when the advertisement is served. For example, an online advertisement may display a viewer's name, or an item the viewer once observed on the advertiser's website. Because this type of advertisement is somewhat personalized, it may be more likely to appeal to a viewer. However, the advertisement would be even more likely to attract the viewer's attention if it could provide additional helpful information targeted to a particular viewer.

Also, advertisers have increasingly relied on social networking systems to create advertisements within the social networking system, because social networking systems have a rich database of user profile information that can be used for ad targeting. However, this type of advertising is still limited to only information that a user provides to the social networking system, so it still provides a somewhat limited ability to personalize ads to users.

Additionally, providing personalized data about users in an advertisement can raise security and privacy issues. Users are already weary of cookie-based online tracking by advertisers, and want to ensure their privacy is maintained within social networking systems. Advertisers have access to the online habits of users, and social networking systems receive large amounts of personal information about their users, such as age, gender, and physical location, as well as family pictures, videos, and email addresses. However, both parties (and their users) may prefer that this information not be shared with the other party and users may prefer that their information be kept as private as possible. Furthermore, advertisers may wish to keep certain information about their ad campaigns confidential, which is difficult to do when this information must be disclosed to the social networking system that will be serving the ads. Methods are desirable that enable more personalized advertisements to be displayed while maintaining privacy or confidentiality of all parties involved in the serving of the ads.

SUMMARY

Embodiments of the invention provide a method for displaying dynamically customized user-specific advertisements to users. Dynamically customized ads allow for the same ad template to be used for many users, but where the content in the ad template is dynamically modified for each user to provide a customized or personalized message to that user allowing much more direct ad targeting. Rather than just populating a simple field in an ad that includes the user's name, the dynamically customized ads provide much more detailed personalized information directed to the viewing user by providing a function in an ad that is solved during ad creation using personalized information about the user provided by the advertiser and/or the social networking system.

A first entity (e.g., the entity wishing to advertise to a user, such as an advertiser) works with a second entity (e.g., the entity that will create and/or control the serving of the ad, such as a publishing system, which can in some embodiments be a social networking system) to provide a dynamically customized ad to a user. An ad template may be used to create the ad, where the ad template includes a function that is solvable using one or more data items or personalized user information provided by the first entity. The ad template and personalized user information can be stored such that they are accessible to the second entity for generating the ad. The data item(s) or personalized information can be stored in a form (e.g., key-value pairs) that obscures the information in some manner from the second entity or that is otherwise without context such that the second entity does not know to what the data refers. For example, the data item can be one of undisclosed meaning. When the second entity receives a request for an advertisement for display to a user (e.g., from the user's web browser), the second entity retrieves the ad template including at least one function selected by the first entity and retrieves personalized information for the user based on a user identifier for determining a value of the function contained in the advertisement. The second entity evaluates the value of the function using the personalized user information, generates an advertisement using the template based on the value of the function, where the function determines at least a portion of a content of the advertisement, and provides the advertisement for display to the user.

Dynamically customized user-specific advertisements represent a large potential source of revenue because they present information that is specific and therefore beneficial to each user. As a user sees more information in advertisements that integrate factors like a user's location, a user's likes and dislikes, or a special deal that has only been made available because that user is a member of a particular organization, for example, the user will be more likely to find such advertisements useful. The advertisements may appear more like personalized messages to users than traditional advertisements. Presenting such advertisements on a social networking system may be desirable, since a social networking system is potentially visited by many users, and the system may provide user profile information in the user-specific advertisements to personalize them even further.

Another embodiment allows data items or personalized information about a user to be included in a customized ad, where the personalized information is provided by a first entity (e.g., an advertiser), is stored by a second entity (e.g., a publishing system, such as a social networking system or other party serving the ad). The ad is served by the second entity, but the personalized information is kept confidential or obscured in some manner from the second entity, or is provided without context or has an undisclosed meaning. For example, the personalized information may be stored with a user identifier as a key-value pair, where only the first entity knows the purpose or context of the information in a given key-value pair table. This allows an advertiser to provide information that only the advertiser may have about a user to a social networking system for ad generation, and even store this information in the social networking system's database, but still maintain a certain level of confidentiality of this information. Thus, if the advertiser wishes to keep certain information about its ad campaign or its users private, it has the ability to do this, while still gaining the benefit of having the social networking system generate and/or serve a customized ad for the advertiser.

In this embodiment, the second entity (e.g., a publishing system, such as a social networking system) stores data items or personalized user information for a plurality of users provided by the first entity (e.g., advertiser), where the meaning of the personalized user information is obscured from the second entity, or the information is provided without context or has an undisclosed meaning. In response to a request for an ad for a user, the second entity retrieves the stored personalized user information with a user identifier, retrieves a template for the advertisement including at least one function, evaluates the value of the function in the template using the personalized user information, generates an advertisement on behalf of the first entity using the template and based on the value of the function, and provides the generated advertisement for display to the user. In one embodiment, the generated advertisement includes a message to the user that has a meaning that is obscured from the second entity.

A further embodiment allows data items or personalized user information provided by two different entities to be included in a customized ad for a user, where neither of the two entities knows the other's information about the user. This allows, for example, an advertiser and a social networking system to both include their own personalized message in a customized ad to that user, while keeping confidential the meaning of that personalized message from each other such that only the user receives and understands the full message from both parties. Thus, the user receives a highly customized ad with personalized data from two entities, but the privacy of the user and proprietary user data of the entities is protected.

In this embodiment, the second entity (e.g., publishing system, such as a social networking system) receives a request for an advertisement for display to a user and retrieves, based on a user identifier, a first data item or personalized user information of the first entity (e.g., advertiser) and a second data item or personalized user information of the second entity. The first personalized information has a meaning that is obscured from the second entity or is otherwise without context and the second personalized information has a meaning that is obscured from the first entity or is otherwise without context. The second entity calculates a value of a first function in the advertisement using the first personalized information and a value of a second function in the advertisement using the second personalized information. The second entity generates the advertisement based on the values and provides the ad for display to the user. In one embodiment, the generated advertisement includes a message to the user with at least one aspect that is obscured from the first entity and at least one aspect that is obscured from the second entity.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
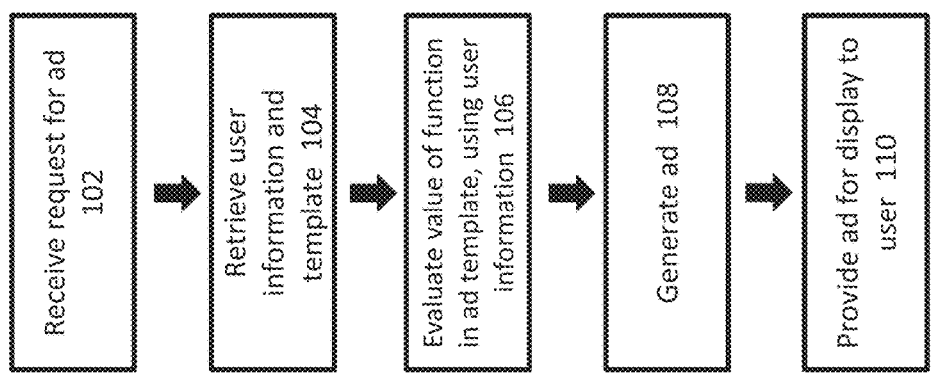
FIG. 1. is a block diagram of a method for generating and displaying dynamically customized user-specific advertisements to a user, in accordance with an embodiment of the invention.

Referring first to FIG. 1, there is shown a diagram of a method for generating and displaying dynamically customized user-specific advertisements to a user, in accordance with an embodiment of the invention. There are two entities referred to with regard to FIG. 1, and throughout this description. One entity is the advertiser, and as used herein the "advertiser" includes any entity wishing to advertise to a user. For the sake of illustration, the term "advertiser" will be used throughout to refer to this entity. The term "advertisement" can include an advertisement for a good or service, a social advertisement including social content (e.g., an indication that a user's connection in a social network "liked" a product or service), or any other content or posting to a page in which a template and/or a function might be used to determine to determine the message included in the posting. The other entity is the advertising provider or publishing system that publishes or serves the advertisement. For the sake of illustration, a social networking system will be used as an example of the publishing system throughout this description, though it is to be understood that the publishing system can be any type of entity that generates and/or provides ads for display to a user, and so is in no way limited to an entity associated with social networking. In some embodiments, the advertiser can also be the social networking system (i.e., the social networking system might be a publishing system for its own advertisements and might use ad templates with functions to publish its own ads), but in other embodiments, the advertiser is a third party advertiser (i.e., is a party other than the social networking system, and the social networking system publishes ads (e.g., on a social networking site or on a third party site external to the social networking system) on behalf of the third party advertiser).

The embodiment of FIG. 1 illustrates the general overview of generating and displaying an advertisement. First, the advertising provider/social networking system receives a request for an advertisement 102. This may be a request from the user's web browser or other requestor to provide an advertisement for that user. The social networking system then retrieves user information and an advertisement template 104. The user information and ad template are stored in a location to which the social networking system has access. For example, these can be provided by the advertiser and stored in one or more social networking system databases. In this case, the social networking system retrieves the user information and ad template from its own database(s). Thus, the advertiser can use the social networking system as a storage place for certain meta data about users, and this further provides the ability to use this offline data of the advertiser in ads created by the social networking system. As another example, one or both of the ad template and user information can be stored elsewhere, such as in an advertiser database to which the social networking system has access. The user information is then used to evaluate the value of at least one function in the advertisement template 106, so that an advertisement can be generated 108 and provided for display to the user 110.

Figure 2:
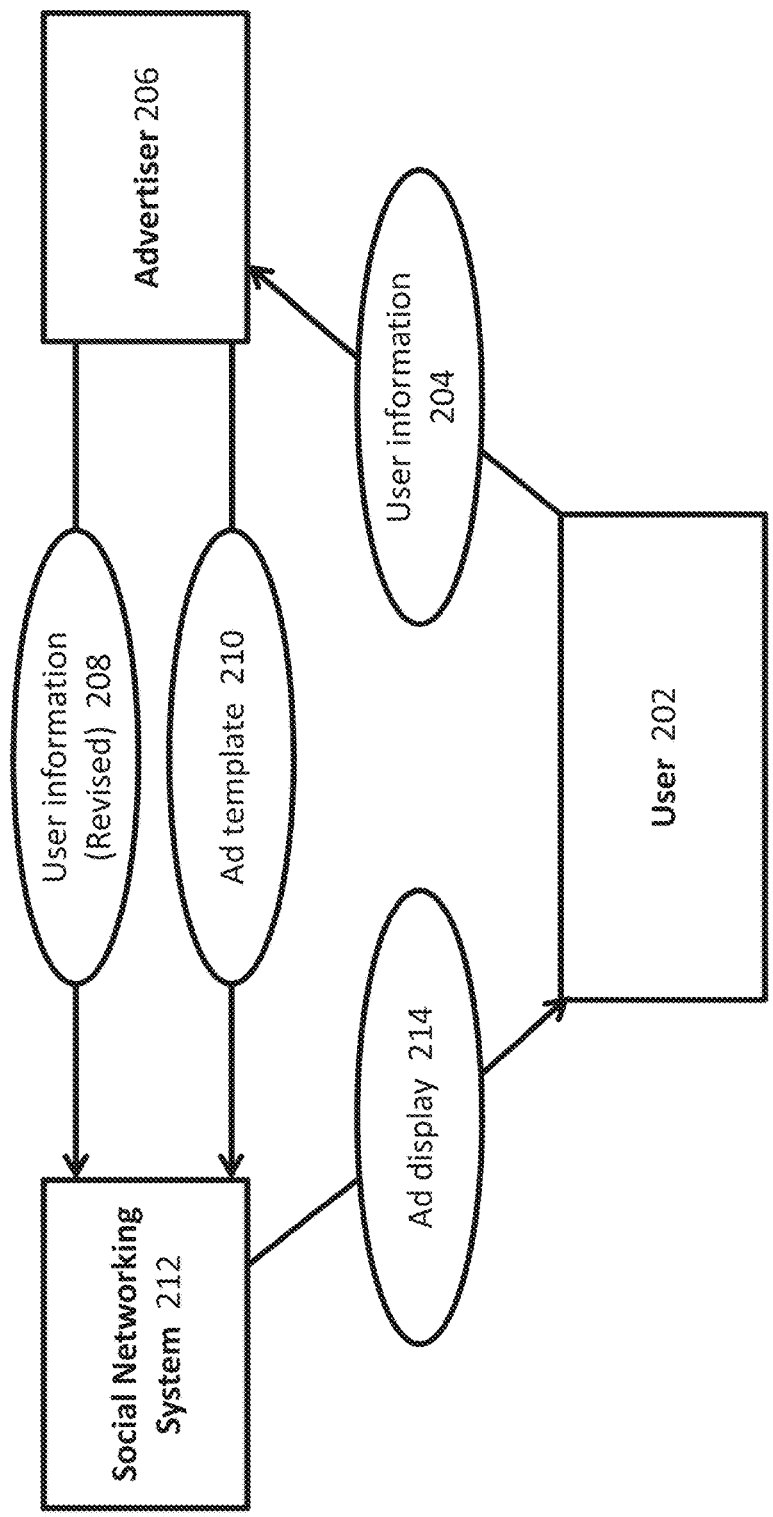
FIG. 2. is an interaction diagram of a process in which a social networking system, user, and advertiser interact to generate a dynamically customized user-specific advertisement to display to a user, in accordance with an embodiment of the invention.

FIG. 2 provides an overview of a process in which a social networking system, user, and advertiser interact to generate a dynamically customized user-specific advertisement to display to a user, in accordance with an embodiment of the invention. First, an advertiser 206 has user information 204 that the advertiser 206 may have collected from a user 202 or about a user. The user 202 might provide information obligatorily (e.g., by an advertiser monitoring a user or a user's actions). For example, an advertiser 206 may keep track of how long a user 202 has been a member of a program run by the advertiser 206, or an advertiser 206 may note that a user's 202 membership with the advertiser's 206 program is about to expire. An advertiser 206 may also keep a log of items that a user 202 has purchased from the advertiser 206. The user 202 may also voluntarily provide information. For example, a user 202 may provide information regarding the user's 202 age, sex, location, education, etc. to an advertiser 206 to use as marketing data. A user 202 might also be able to "check in" at an advertiser's 206 business, or provide information about favorite foods and dishes at an advertiser's 206 restaurant, for example, where all of this information has been voluntarily provided to the advertiser 206.

In some embodiments, the advertiser uploads a variety of different kinds of meta data about a user to the social networking system, and has access to this data to modify it, remove it, add additional data, etc. In another embodiment, the advertiser 206 may upload a set of meta data about a user along with information that matches the meta data to a particular user 202. For example, this information that matches the meta data to the user may comprise a cryptographic fingerprint (or hash, checksum, etc.) of identifying information for the user or information from a user's profile, such as a cryptographic fingerprint of the user's first name, last name, and zipcode. Other identifying information that can be used in the fingerprint includes a user's phone number, nickname, photo, birthdate, interests/likes, and so forth. Multiple of these items can be included in the fingerprint. As another example, this information that matches the meta data to the user may also comprise a cryptographic fingerprint of the user's email address. The advertiser 206 is therefore not required to identify the user 202 via a mechanism of the social networking system, such as by using the social networking systems user ID for the user, but instead the advertiser can provide or generate his own identifier for the user. In further embodiments, the user has access to some or all of the data, which the user can also view and possibly modify. It is also possible that certain data is shared with a user's friends (e.g., a user could opt in to have certain data visible to others).

An advertiser 206 may take the user information 204 and revise it into a form 208 suitable for a social networking system 212 to retrieve. A social networking system offers its users the ability to communicate and interact with other users of the social networking system. Users join the social networking system and add connections to a number of other users to whom they desire to be connected. Users of the social networking system can provide information describing themselves, which is stored in user profiles. For example, a user can provide their age, gender, geographical location, education history, employment history, etc. The information provided by users may be used by the social networking system to provide information to the user. For example, the social networking system may recommend social groups, events, and potential friends to a user.

In one embodiment, the user information 208 retrieved by the social networking system 212 may comprise key-value pairs. In a further embodiment, each key-value pair includes a user ID and at least one value. The value can be a value that is not part of a user profile on a social networking system 212. There may also be multiple values for a given key or user ID. The ad template can also include a directive to retrieve certain information as the value. In some embodiments, the provided user information 208 is fixed for each user, while in other embodiments, the provided user information 208 may change dynamically. For example, if an advertiser 206 is keeping track of how long a user 202 has been a member of a program run by the advertiser 206, this information will change daily. The final advertisement can display the updated user information in real time. In some embodiments, the user information 208 may be stored by an advertiser 206, the social networking system 212, or by a third party.

Other than the user information 208, an advertiser 206 may provide an advertisement template 210 to the social networking system 212. The template 210 provides an outline of the advertisement, comprising one or more functions to be "filled in" by the user information 208. In other words, the provided user information 208 will be used to evaluate a value of a function provided in the advertisement template 210. In one embodiment, the social networking system 212 designs the advertisement template. For example, the social networking system 212 could design a variety of stock templates from which the advertiser can choose an appropriate template for the advertisement to be served. In this example, the advertiser 206 may be able to modify the stock template in a variety of ways. The advertiser 206 may be able to include a particular function designed by the advertiser 206. The advertiser 206 may also be able to select a function from a stock collection of functions provided by the social networking system 212. In another embodiment, the advertiser 206 designs the advertisement template 210 and/or the function to be included in the advertisement template 210, and the advertiser 206 provides this to the social networking system 212. The functions can also cascade and can be nested in each other. In some embodiments, the advertiser can include one or more variables in the advertisement template. In some embodiments, the advertisement is just the variable or function itself such that the advertiser has complete control of the content to provide a custom message.

The template 210, including functions within the template 210, may be designed in various ways. In some embodiments, the template and/or functions are configured to change dynamically depending on various factors, such as the time of day or year. For example, an advertiser 206 may wish to provide an "early bird deal" to certain customers in the morning, and provide an appropriate template 210 or function for use in the morning that differs from a template 210 or function used for display 214 to these customers in the afternoon. In some embodiments, the ad template is replaced with a rules engine that applies certain rules when generating the advertisement. As described above, the function can also include a directive to retrieve data from some source.

Advertisement templates 210 can be used within a social networking system 212 for advertisers 206 to host and develop dynamically customized user-specific advertisements. Because privacy and security of data within the social networking system 212 are critical issues to the continued growth of a social networking system 212, these advertisements can be generated so that the social networking system 212 that displays the advertisement cannot glean or fully understand personal user information from the user information 208 and/or advertisement template 210 provided by the advertiser. If the user information 208 is stored as key-value pairs, the social networking system 212 may not be able to discern what the key-value pairs refer to, and will only have the ability to plug the key-value pairs into an advertisement template 210 also provided by the advertiser 206.

As one example, where the advertiser 206 is a company such as AMAZON®, the advertiser may provide to the social networking system 212 key-value pairs associated with users who are AMAZON PRIME® members. Such a table of key-value pairs might include a user ID for each user (e.g., the user's email address, an advertiser-provided user identifier or cryptographic fingerprint, or other identifier) as the key, and might also include a value of "yes" or "no" (or "1" or "0," or some other values that represent yes or no) regarding whether or not a user is an AMAZON PRIME® member. When the social networking system 212 retrieves a data item or the personalized information for a given user, the social networking system 212 looks up the user's ID in the key-value pairs table to determine what is the appropriate value for that user (e.g., "yes" or "no"), and uses this value to evaluate the function in and ad template that includes a function "if value is yes, then 10% and if value is no, then 5%", where 10% and 5% indicate the discount being offered to a user on an AMAZON® product being advertised. While the social networking system 212 knows that the given user has a value of "yes" or "no" from the key-value pairs table, the social networking system 212 may not know the meaning of this information. In other words, AMAZON® may not indicate that the table has anything to do with PRIME® membership, such that the social networking system 212 only knows that the table includes a list of user IDs with values of "yes" or "no," but does not know what these values mean. In this manner, the meaning of the data item or personalized information about each user is obscured from the social networking system 212 or is without context such that the social networking system 212 does not understand or know to what the information refers. This is just one example of how the information can be obscured, undisclosed, lacking in context, or otherwise kept confidential in some manner. A variety of other ways are also possible. For example, the table may be designated AMAZON PRIME® membership, but the values listed as "x" and "y," such that the social networking system 212 does not know which is a yes and which is a no. Similarly, "x" and "y" (or "yes" or "no") might mean something other than whether or not someone is a PRIME® member, such as more than 10 years membership versus less than 10 years membership, a member who spends more than $50 a month versus one who does not, a member who visits AMAZON® more than once a week versus one who does not, and so forth. In another embodiment, the personalized user information is hashed. In a further embodiment, the personalized user information or some aspect of the information is encrypted.

Furthermore, advertisements can be generated so that the advertiser 206 cannot glean or fully understand information plugged into an advertisement template 210. For example, some of the information included in an ad may be information supplied by the social networking system 212. The social networking system 212 can include information that the social networking system has about the user, such as user profile information that a user provided to a social networking system 212, or information the social networking system 212 has collected about a user based on the user's actions on the social networking system 212 (e.g., sites a user has "liked," online events a user has attended, etc.). Since the social networking system 212 is the party generating the ad, the social networking system 212 can include this type of personalized user information in the ad without having to share this information with the advertiser 206. In some embodiments, the advertiser 206 can even select a function for the ad template that specifically calls for certain user profile information to be provided by the social networking system 212 to which only the social networking system 212 may have access. In other embodiments, the advertiser 206 can select two (or more) functions, one that calls for advertiser information about a user (e.g., user information 208) and one that calls for social networking system information about a user (e.g., social network profile information).

In this way, dynamically customized user-specific advertisements may be created for display within the social networking system 212 without compromising the security and integrity of personalized user information that the social networking system 212 has collected for a user 202, and user information 204 that the advertiser 206 has collected for a user 202. And, the social networking system 212 and advertiser 206 can keep their own user information secret from each other. Yet, the user can receive an ad with a very personalized message in the ad that includes information from one or both parties (the advertiser and social networking system). In one embodiment, only the user understands the full meaning of the message as certain aspects of the message are obscured from or not understood by one or both of the advertiser 206 and the social networking system 212. In some embodiments, the ad displays attribution for the ad, such as indicating that the advertisement is providing a message from advertiser X or from social networking system Y. Thus, the user can be made aware that, while the social networking system is providing the ad for the user, the advertising message (and the user's personal data on which the advertising message is based) is from the advertiser rather than the social networking system.

Figure 3:
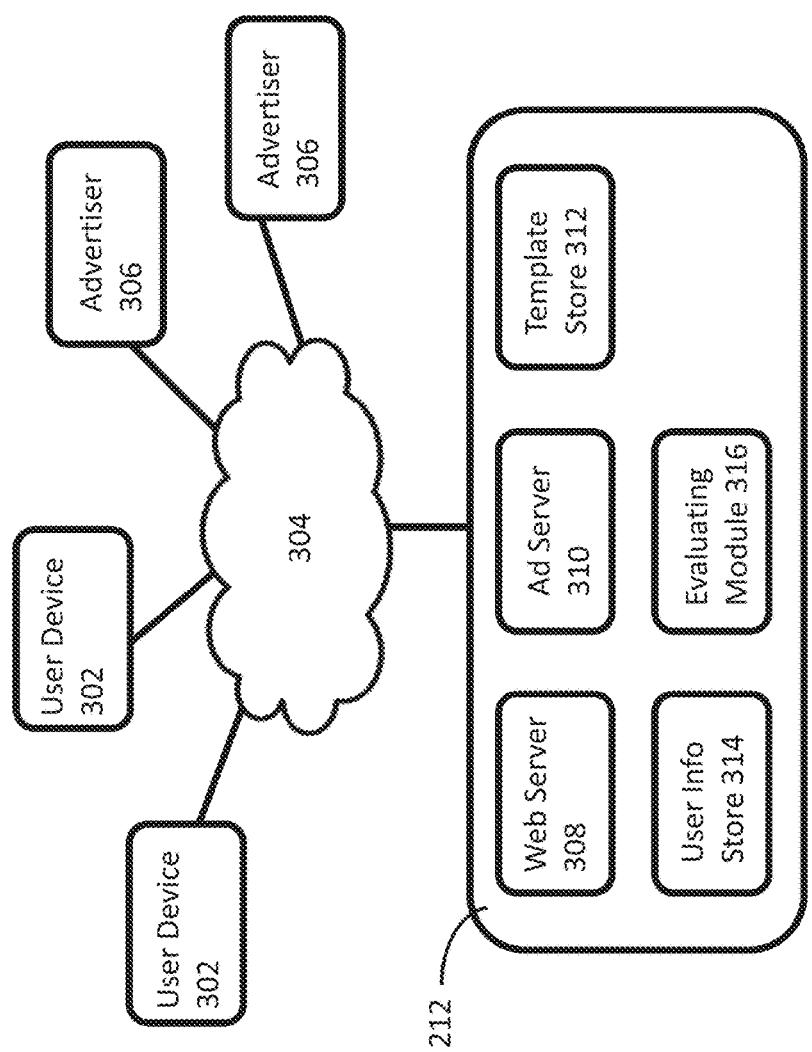
FIG. 3. is a network diagram of a system environment for providing dynamically customized user-specific advertisements to users of a social networking system, showing a block diagram of the social networking system, in accordance with an embodiment of the invention.

FIG. 3. is a network diagram of a system environment for providing dynamically customized user-specific advertisements to users of a social networking system, in accordance with an embodiment of the invention. The system environment comprises one or more user devices 302, one or more advertisers 306, a social networking system 212 for providing advertisements, and a network 304. In alternative configurations, different and/or additional modules can be included in the system.

The user devices 302 comprise one or more computing devices that can receive user input and can transmit and receive data via the network 304. In one embodiment, the user device 302 is a conventional computer system executing, for example, a Microsoft Windows-compatible operating system (OS), Apple OS X, and/or a Linux distribution. In another embodiment, the user device 302 can be a device having computer functionality, such as a personal digital assistant (PDA), mobile telephone, smart-phone, etc. The user device 302 is configured to communicate via network 304. The user device 302 can execute an application, for example, a browser application that allows a user of the user device 302 to interact with the social networking system 212. In another embodiment, the user device 302 interacts with the social networking system 212 through an application programming interface (API) that runs on the native operating system of the user device 302, such as iOS 4 and ANDROID.

In one embodiment, the network 304 uses standard communications technologies and/or protocols. Thus, the network 304 can include links using technologies such as Ethernet, 802.11, worldwide interoperability for microwave access (WiMAX), 3G, digital subscriber line (DSL), etc. Similarly, the networking protocols used on the network 304 can include, for example, multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 304 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 3 includes a block diagram of an embodiment of the social networking system 212. The social networking system 212 includes a web server 308, an advertisement server 310, an advertisement template store 312, a user information store 314, and an evaluating module 316. In other embodiments, the social networking system 212 may include additional, fewer, or different modules for various applications. Conventional components such as network interfaces, security functions, load balancers, failover servers, management and network operations consoles, and the like are not shown so as to not obscure the details of the system.

The web server 308 links the social networking system 212 via the network 304 to one or more user devices 302 and one or more advertisers 306; the web server 308 serves web pages, as well as other web-related content, such as Java, Flash, XML, and so forth. The web server 308 may provide the functionality of receiving and routing messages between the social networking system 212 and the client devices 302 or between the social networking system 212 and the advertisers 306, for example, instant messages, queued messages (e.g., email), text and SMS (short message service) messages, or messages sent using any other suitable messaging technique. Additionally, the web server 308 may provide API functionality to send data directly to native client device operating systems, such as iOS, ANDROID, webOS, and RIM.

An advertisement server 310 serves advertisements within the social networking system 212 to user devices 302. For example, a web page being viewed on a web browser on a user device 302 may have advertisements served by the advertisement server 310 in certain regions of the web page, like traditional banner advertisements, or as part of the social networking experience as a story, a post in the stream, a fan page for a particular brand, or social gaming applications that operate within the social networking system 212. An advertisement server 310 may also serve dynamically customized user-specific advertisements via the network 304 to external websites. These external websites may embed dynamically customized user-specific advertisements in inline frames (iFrame). The advertisement server 310 may also serve dynamically customized user-specific advertisements in third-party applications on user devices 302. In one embodiment, an advertisement server 310 may serve advertisements to a native platform's operating system, such as iOS and ANDROID, to appear as advertisements in native applications.

A template store 312 maintains advertisement template objects that have been developed by an advertiser 306 and sent through the network 304 to the social networking system 212. In some embodiments, the template store 312 (or a separate template store) stores stock templates from which an advertiser can select a template appropriate for the advertiser's ad. In further embodiments, the template store 312 (or a separate store) stores functions that can be used in the stock temples from which the advertiser can choose. A user information store 314 maintains user information that has been provided by an advertiser 306 and sent through the network 304 to the social networking system 212. In some embodiments, user information store 314 (or a different user information store) also stores information about a user collected by the social networking system 212, such as user profile data and information about user's actions on the social networking system 212. An evaluating module 316 includes a process that parses markup language in the advertiser-developed template objects and replaces advertiser-developed source code with tags that can be interpreted by the social networking system 212. The evaluating module 316 proceeds to evaluate a value of a function in the advertisement template using the user information, and ultimately generating a dynamically customized user-specific advertisement for display to a user.

Figure 4:
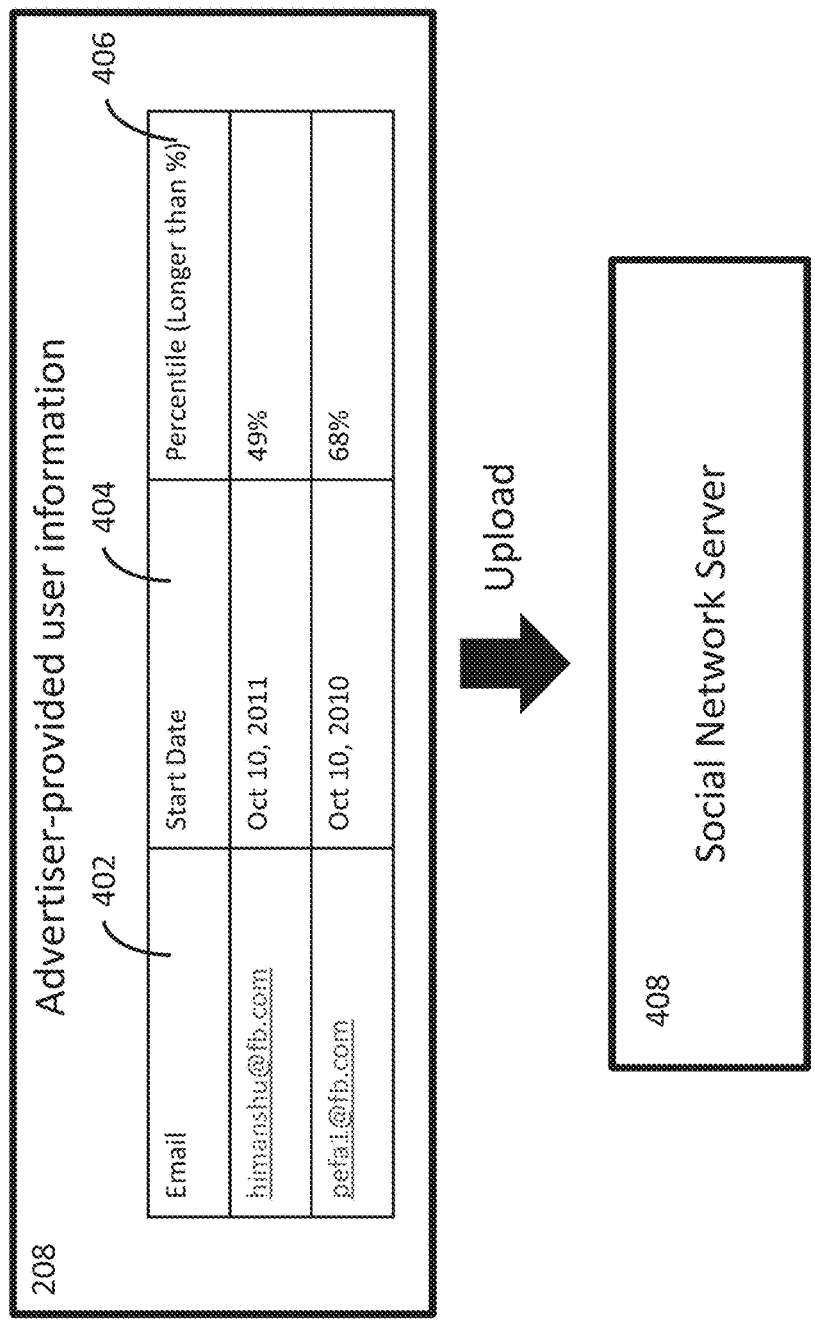
FIG. 4. illustrates an example of user information provided by an advertiser, which is then uploaded onto a social network server, in accordance with an embodiment of the invention.

FIG. 4 illustrates an example of user information 208 that an advertiser might provide to a social networking system for use in an advertisement. User IDs are supplied in the form of email addresses 402 to identify each user. One value 404 designates each user's start date as an employee of a company, while another value 406 shows that the user has been working at the company for a longer period of time than a particular percentage of the employees. This key-value pair information can be uploaded onto a server 408, in this example a social network server. If the advertiser wanted to further obscure the information provided in the table, the advertiser could have left out the details that state that the dates 404 are start dates and that the percentages are "longer than %."

Figure 5:
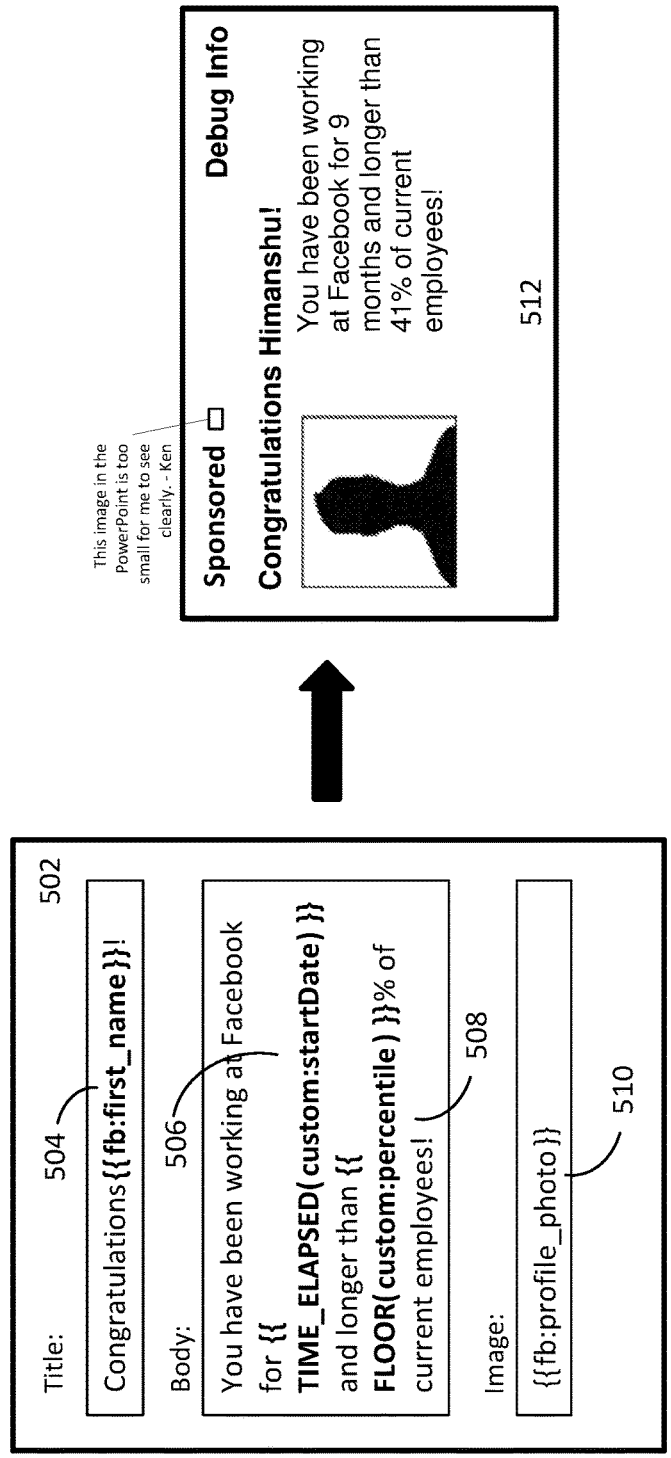
FIG. 5. illustrates an example of an advertisement template provided by an advertiser, which, with the addition of user information, is used to generate a dynamically customized user-specific advertisement, in accordance with an embodiment of the invention.

FIG. 5 shows a sample advertisement template 502 that can also be uploaded onto a server. In the advertisement template 502, advertiser-provided user information in FIG. 4 can be used to fill in the given functions. For example, the user's name may be filled in the first function 504. The function begins with "fb," in this case indicating it requires a social networking system value, in this case an "fb" or FACEBOOK® value. Thus, the social networking system can retrieve the value of the user's first name to evaluate the function 504. The start date value 404 may be used to evaluate the second function 506, while the percentile value 406 may be used to evaluate the third function 508. Both of these are indicated as "custom" functions instead of "fb"

functions, indicating that the values are to be retrieved from the advertiser or from information stored for the advertiser, such as a start date of an employee that may have been uploaded to the social networking system by the advertiser. The template also supplies a function 510 where a photograph may be provided. Since this is also an "fb" function, it is the social networking system profile photo for the user that is retrieved. After the user information has been used to evaluate the values of the functions in the template, a dynamically customized user-specific advertisement 512 can be generated and displayed to the user. This advertisement can be shown to many different users who work at a particular company, but is customized and specific to each user who views the advertisement, including having each user's own name and photo, own start date with the company, own worked for longer than X % of current employees value, etc. In addition, the ad 512 includes information provided by the social networking system and by the advertiser. Only the user may see the completed ad with all of the information included. In the example of FIG. 5, the advertiser is the social networking system (e.g., FACEBOOK®), but other examples the advertiser may be another entity. Where the advertiser is a different entity, the advertiser sees at most the template, but does not know the social networking system values that are filled in (e.g., values 504 and 510). Similarly, the social networking system may or may not know the meaning of the values 506 and 508 that are filled in.

Figure 6:
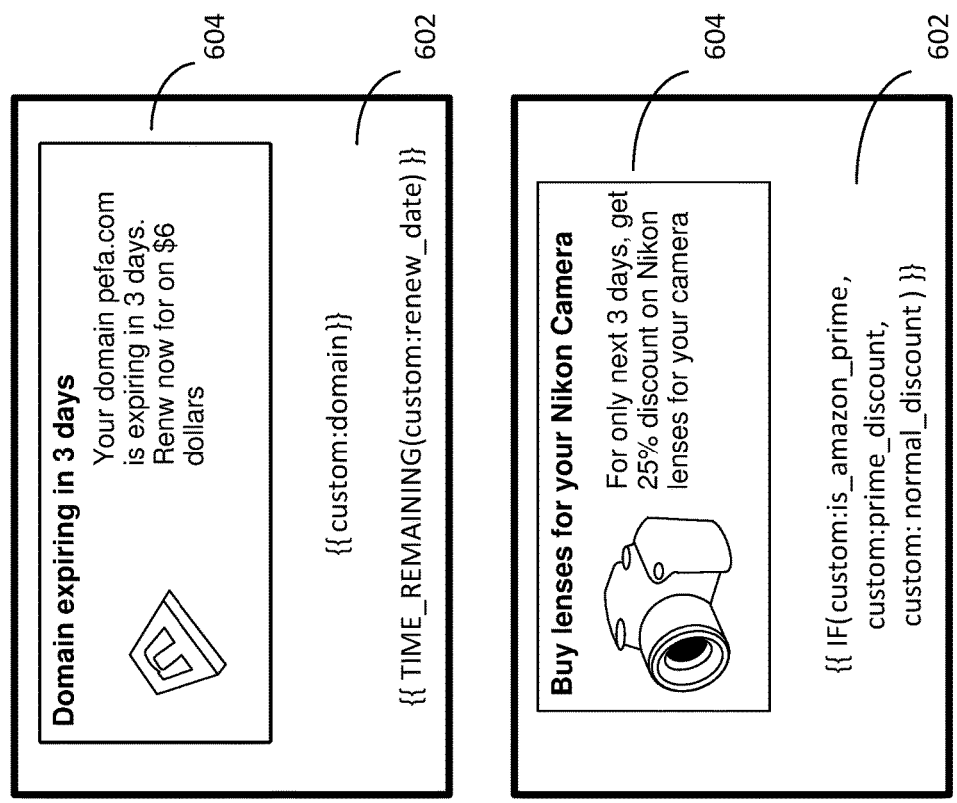
FIG. 6. illustrates further examples of advertisement templates that could be used to generate dynamically customized user-specific advertisements, in accordance with an embodiment of the invention.

FIG. 6 displays two alternative examples of user-specific advertisements. Advertisement templates are filled in by the various values 602 derived from user information, and dynamically customized user-specific advertisements 604 are generated that appear personalized to each user. In this way, these advertisements may appear more like personalized messages than traditional advertisements. In the first example, the social networking system retrieves a value for domain and renew date to evaluate the functions in the ad template. Thus, in this case the function is a "TIME-REMAINING" function. In the second example, the social networking system retrieves the value for whether the user is an AMAZON PRIME® member and, where the user is a PRIME® member, the prime discount is included and where the user is not a PRIME® member, the normal (non-PRIMED) discount is used. Thus, in this case the function is an "IF" function. Other functions are possible too (e.g., "ADD" function or other library function, such as those used in spreadsheet applications).

FIGS. 4-6 provide just some examples of applications for the system, but many others are also possible. One example is loyalty points tracking. For example, a user can get loyalty points for certain interactions with a business, including purchasing something from the business, entering the business, etc., and the advertisement could include a function that provides some benefit to the user based on these loyalty points. Another example include using the system for retargeting data, so that a user sees customized product name, price, image, message based on the last product they were looking at. Further examples include providing a last movie ordered in a recommendation for another movie, providing a customized message to a user playing a game based on a game level that user is currently on, providing an ad in which stock price or other financial data varies, and so forth.

Even further examples of possible ads include the following:

20% sale at ZAPPOS with coupon "movefast" expires in {countdown_to("2012-08-01 5 pm")}

RIPSTIK® sale on woot.com. Hurry. Only {curl_int("http://www.woot.com/get_inventory.php")} left in stock.

Looking for a better anti-depressant? Try Prenozipam. {terms_link("http://www.prenozipam.com/terms")}

Your domain name {$custom:expiring_domain_name} will expire in {days_until($custom:expiring_domain_date)}. Click here to renew at 10% off.

STARBUCKS®. The best coffee in {$profile:CityState}.

STARBUCKS®. The best coffee at {$profile:College}.

Like {$profile:MatchingKeyword}? You'll love MOONALICE . . . And we're coming to Palo Alto on 8/1.

Refinance at {curl_int("http://www.bankrate.com/best_loan_rate.php")}%

2 Year CD—{curl_int("http://www.bankrate.com/best_cd_rate.php?term=2")}%

Your domain name {$custom.expiring_domain_name} will expire in {if(greater_than(days_until($custom.expiring_date), 1), str_concat(days_until($custom.expiring_date), "days."), "tomorrow!"} Click here to renew!"

"Depressed? Millions of people have found relief from Prozac. {display_terms_link('Terms', 'http:/www prozac.com/terms.php')}"

The system can also be used outside of advertisements. As one example, the system can be used for personalized page posts or posts by a user on a wall or page in a social networking environment. The system could provide various page post templates for the user to select or could provide a template with functions for the user to select. The system could also be used for custom bar codes or QR codes (e.g., there could be a custom bar code for a particular offer or tied to a particular user), custom advertiser-ids in URLs, point-of-sale "check-in notes" style personalization (e.g., letting a user know that from his check-in notes regarding a restaurant that he "checked into" within the social networking system that his favorite dessert is Tiramisu, and so offering him a discount on Tiramisu in a personalized ad), among other uses.

While various embodiments have been described above, it should be understood that they have been presented by way of example only, and not limitation. Thus, the breadth and scope of a preferred embodiment should not be limited by any of the above-described exemplary embodiments.

What is claimed is:

1. A computer-implemented method comprising:
receiving, by a publishing system from an advertiser, a data item for each of a plurality of users of the publishing system, the data item having a meaning confidential to the publishing system and stored by the publishing system;
responsive to a request to provide an advertisement for display to a target user of the plurality of users, the publishing system generating an advertisement on behalf of the advertiser by:
retrieving a template for the advertisement including at least one function selected by the advertiser,
retrieving from storage of the publishing system, the data item for the target user,
evaluating a value of the function in the template using the retrieved data item for the target user, and
generating the advertisement using the template and based on the value of the function; and
providing the generated advertisement for display to the target user.

2. The method of claim 1, wherein the publishing system is a social networking system.

3. The method of claim 1, wherein at least one aspect of the data items is obscured from the publishing system.

4. The method of claim 1, wherein additional information about the target user is retrieved from a user profile for the target user in the publishing system and is used to generate the advertisement.

5. The method of claim 1, wherein the data items for the users are provided with identifiers for the users as key-value pairs.

6. The method of claim 5, wherein values of the key-value pairs are obscured from the publishing system or are provided without context.

7. The method of claim 1, wherein each of the plurality of users has voluntarily provided the user's data item to the advertiser.

8. The method of claim 1, wherein the data item is retrieved based on the function in the template for evaluating the value of the function using the data item.

9. The method of claim 1, wherein a plurality of templates and a plurality of functions are provided by the publishing system for selection by the advertiser, and wherein retrieving the template further comprises retrieving the template selected by the advertiser with the function selected by the advertiser.

10. The method of claim 1, further comprising:
storing, by the publishing system, the data items received from the advertiser.

11. The method of claim 1, wherein a function within the template changes dynamically depending on a time of day or year.

12. The method of claim 1, wherein the data items are dynamically customized to the target user in real time.

13. The method of claim 1, wherein the generated advertisement includes a message to the target user that has a meaning that is obscured from the publishing system.

14. The method of claim 1, wherein the data item retrieved is an input to the function used to solve the function and the value is an output of the function.

15. The method of claim 1, further comprising
storing, at the publishing system, meta data received from an advertiser about a plurality of users; and
storing, at the publishing system, the template for an advertisement from the advertiser, the template including the at least one function selected by the advertiser, wherein the data item retrieved by the publishing system is retrieved from the stored meta data, and the template retrieved by the publishing system is the stored template.

16. A computer-implemented method comprising:
receiving a request, at a publishing system, for an advertisement for display to a target user on behalf of an advertiser;
responsive to the request, the publishing system:
retrieving a template for the advertisement including at least one function,
retrieving from storage of the publishing system, a data item associated with a user identifier for the user, the data item having a meaning confidential to the publishing system without context,
evaluating a value of the function in the template using the retrieved data item for the user, and
generating the advertisement using the template and based on the value of the function; and
providing the generated advertisement for display to the user.

17. The method of claim 16, wherein the publishing system is a social networking system.

18. The method of claim 16, wherein the data item is provided by the advertiser.

19. The method of claim 16, wherein the data item is retrieved from a user profile of the user within a social networking system.

20. The method of claim 16, wherein the template is provided by the advertiser and wherein the function is selected by the advertiser.

21. The method of claim 16, wherein the template and the data item are provided by the advertiser and stored in a database of the publishing system.

22. The method of claim 21, wherein the user has access to and can modify the data item stored in the database.

23. The method of claim 16, wherein the data item is provided with an identifier for the user as a key-value pair.

24. The method of claim 16, wherein the generated advertisement includes a message to the user that has a meaning that is obscured from the publishing system.

25. The method of claim 16, further comprising receiving from the advertiser meta data for the user and a user identifier for matching the user to the meta data.

26. The method of claim 25, wherein the user identifier for matching the meta data comprises a cryptographic fingerprint of identifying information for the user.

\* \* \* \* \*